United States Patent [19]
Bidaud

[11] Patent Number: 5,944,166
[45] Date of Patent: Aug. 31, 1999

[54] PALLET CONVEYOR INTERSECTION APPARATUS AND PALLET CHANGE-OVER APPARATUS FOR A PALLET CONVEYOR

[75] Inventor: Daniel Bidaud, Taverny, France

[73] Assignee: ABB Preciflex Systems, Beauchamp, France

[21] Appl. No.: 08/860,752

[22] PCT Filed: Jan. 8, 1996

[86] PCT No.: PCT/FR96/00026

§ 371 Date: Jul. 8, 1997

§ 102(e) Date: Jul. 8, 1997

[87] PCT Pub. No.: WO96/21611

PCT Pub. Date: Jul. 18, 1996

[30] Foreign Application Priority Data

Jan. 10, 1995 [FR] France .................................. 95 00197

[51] Int. Cl.$^6$ ................................................ B65G 29/00
[52] U.S. Cl. ........................................................ 198/465.1
[58] Field of Search ............................ 198/465.1, 468.8, 198/465.2

[56] References Cited

U.S. PATENT DOCUMENTS

| | | |
|---|---|---|
| 3,451,526 | 6/1969 | Fernandez . |
| 3,622,043 | 11/1971 | Chotard ................................. 198/465.1 |
| 5,044,541 | 9/1991 | Sekine et al. .............................. 228/6.1 |
| 5,090,555 | 2/1992 | Koura ..................................... 198/465.1 |
| 5,127,569 | 7/1992 | Sekine et al. ............................. 228/6.1 |
| 5,253,745 | 10/1993 | Van Den Bergh et al. ......... 198/465.1 |
| 5,320,210 | 6/1994 | Van Den Bergh et al. ......... 198/465.1 |

FOREIGN PATENT DOCUMENTS

| | | |
|---|---|---|
| 474514 | 3/1992 | European Pat. Off. . |
| 2241477 | 3/1975 | France ................................. 198/465.1 |
| 2260717 | 4/1993 | United Kingdom . |

*Primary Examiner*—James R. Bidwell
*Attorney, Agent, or Firm*—Griffin, Butler Whisenhunt & Szipl, LLP

[57] ABSTRACT

Pallet conveyor intersection apparatus having a central portion and plural conveyor portions connected to the central portion. Each of the conveyor portions has a pallet way along which pallets can be driven. The pallet ways of at least two of the conveyor portions are disposed at different levels, and the central portion is configured so that it can vertically displace a pallet, situated on the central portion, between levels corresponding to the different levels of the pallet ways of the conveyor portions. A pallet to be used in this system has a peripheral coupling which may be oriented facing at least one of the conveyor portions. The pallet's coupling can be engaged with or disengaged from a complementary coupling associated with the facing conveyor portion by vertically displacing the pallet.

10 Claims, 5 Drawing Sheets

FIG. 1

FIG_3

FIG._4

FIG_5

PALLET CONVEYOR INTERSECTION APPARATUS AND PALLET CHANGE-OVER APPARATUS FOR A PALLET CONVEYOR

The present invention relates to pallet conveyor intersection apparatus, in particular for conveyors used in a production workshop. It also relates to pallet change-over apparatus for a pallet conveyor, which change-over apparatus implements the above-mentioned intersection apparatus.

BACKGROUND OF THE INVENTION

In a production workshop, e.g. for producing sheet metal assemblies, workstations are increasingly being organized into manufacturing islands which perform shaping and assembly operations on a subassembly being assembled. To make up subassemblies or assemblies, the parts to be assembled together are placed on supports that can be of different types. When such supports are voluminous and specific to a given series of assembly operations, they are referred to as "pallets". Such pallets are assigned to a given island, and only the parts travel from island to island. For the purposes of transporting the pallets within an island, pallet conveyors are often used serving the various workstations. Sometimes, it can be useful to implement one or more conveyor intersections for serving the various workstations and/or for feeding one or more pallets onto a main conveyor or removing one or more pallets therefrom. Intersections are thus obtained, each of which is constituted by a central portion connected to the various conveyor pallet-way portions that are generally perpendicular to one another. Switching the pallets onto the various pallet-way portions requires special intersection apparatus as provided by the present invention.

More particularly, in modern workshops, it must be possible to adapt each island to enable different types of subassemblies or assemblies to be assembled, so that each island has various pallets suited to the various types of subassemblies arriving at the work island. In order to enable a determined pallet to be placed on a conveyor, a pallet magazine is currently used disposed transversely to the conveyor. Such a magazine is generally implemented in the form of a carriage or traverser having a translation axis that is substantially perpendicular to the direction of the conveyor. The traverser is associated with a driving control member which enables it to be displaced transversely so as to place the appropriate pallet on the conveyor. The conveyor is itself provided with drive means for driving the pallet, e.g. drive means constituted by a self-propelled carriage including means for coupling it to the selected pallet and means for guiding it and driving it in translation along the main pallet way, so as to place the pallet in the various positions associated with the various workstations in the island.

However, in that type of apparatus, the mass of the traverser plus the pallets that it displaces makes it necessary to provide drive means that are powerful and therefore costly. In addition, the large mass results in operating inertia which increases the response time required by the traverser to respond to the instructions that are transmitted to it, which slows down the pallet change-over process.

It therefore appears to be useful to design pallet change-over apparatus having a simpler structure, and having moving parts with less inertia. An object of the invention is therefore to provide pallet change-over apparatus for a pallet conveyor.

OBJECTS AND SUMMARY OF THE INVENTION

The invention therefore provides pallet conveyor intersection apparatus comprising a central portion and conveyor portions connected to the central portion, each of the conveyor portions being provided with a pallet way for supporting pallets, and with drive means for driving the pallets along the pallet way. According to the invention, the pallet ways of at least two of the conveyor portions are disposed at different levels, the central portion is provided with lift means for vertically displacing a pallet situated on the central portion between levels corresponding to the different levels of the pallet ways of the conveyor portions, and the pallet is provided with peripheral coupling means organized facing at least one of the conveyor portions, which means can be engaged with or disengaged from complementary coupling means associated with the facing conveyor portion, by vertically displacing the pallet by means of the above-mentioned lift means.

Thus, on actuating the lift means for displacing the pallet situated on the central portion from an initial level to a final level, the peripheral coupling means of the pallet are automatically engaged with the complementary coupling means associated with the conveyor portion whose level corresponds to the final level of the pallet, and they are simultaneously disengaged from the complementary coupling means associated with the conveyor portion whose level corresponds to the initial level of the pallet. It can be understood that the complementary coupling means may be associated directly or indirectly with the corresponding conveyor portion. More precisely, the complementary coupling means may be carried either by a pallet situated on the conveyor portion with which they are associated, or directly by the drive means of the conveyor portion by being secured to a carriage mounted to slide parallel to the pallet way of said conveyor portion.

Advantageously, the coupling means are hooks of the type having complementary shapes.

In a particular embodiment, the apparatus comprises two main conveyor portions whose pallet ways extend at the same level in a main direction on either side of the central portion, and at least one secondary conveyor portion whose pallet way extends at a different level in a secondary direction that is substantially perpendicular to the main direction.

Advantageously, the pallet ways of the main conveyor portions are then situated at a level that is lower than the level of the pallet way of the secondary conveyor portion.

Also advantageously, the apparatus includes two secondary conveyor portions whose pallet ways extend at the same level in the secondary direction on either side of the central portion.

More precisely, the central portion comprises a main conveyor central portion having a fixed pallet way interconnecting the pallet ways of the two main conveyor portions, so that the three portions form an uninterrupted main conveyor portion, and a secondary conveyor central portion having a pallet way that is mounted to move vertically between a high position in which it extends in alignment with the pallet way of the secondary conveyor portion, and a low position in which it allows a pallet to travel over the pallet way of the main conveyor central portion.

Advantageously, the main conveyor portions then form a main conveyor, which conveyor is provided with drive means which comprise a carriage mounted to slide on a runner parallel to the pallet way of the main conveyor, and equipped with retractable engagement means for coupling the carriage to a pallet carried by the pallet way of the main conveyor.

The invention also provides pallet change-over apparatus for a pallet conveyor, said apparatus comprising intersection apparatus of the invention, in which the secondary conveyor portions form sidings for parking the pallets.

It is thus possible to place one or more pallets in rows on the sidings formed by the secondary conveyor portions while a pallet or a train of pallets is kept moving on the main conveyor. To replace a pallet situated on the main conveyor with a pallet parked on one of the secondary conveyor portions, the drive means associated with the main conveyor are used to displace the pallet that is to be replaced so as to position it on one of the portions of the main conveyor that is adjacent to the central portion. The lift means are placed in a position whose level corresponds to that of the secondary conveyor portion on which the replacement pallet is situated. The drive means of said secondary conveyor portion are actuated so that the pallet is placed on the central portion. The lift means are placed in a position whose level corresponds to that of the main conveyor. During this vertical displacement, the peripheral coupling means of the pallet that are associated with the main conveyor portion on which the pallet to be replaced is disposed engage with the corresponding peripheral coupling means of the pallet to be replaced. The drive means of the main conveyor portions then displace the two pallets coupled together in this way, so that the pallet to be replaced is placed on the central portion, while the replacement pallet is placed on another main conveyor portion adjacent to the central portion. The lift means, and therefore the pallet to be replaced, are placed at the level corresponding to the secondary conveyor portion which is to serve as a siding for parking the pallet. The peripheral coupling means of the pallet are disengaged from the corresponding peripheral coupling means on the replacement pallet. The drive means of the secondary conveyor portion drive the pallet to be replaced along said portion until it reaches a parked position in which it is fully disengaged from the central portion. The desired pallet change-over operation is thus achieved.

It should be noted that the masses displaced during this change-over are limited to the masses of the pallets, together with the masses of any assemblies and subassemblies that they are carrying, which makes it possible to use drive means that are simple and that are of much lower power than the means required in the traverser apparatus of the prior art. In addition, by limiting the masses displaced, it is possible to obtain short response times because of the smallness of the inertia against which the drive means operate, and thus to reduce the time required to change a pallet.

BRIEF DESCRIPTION OF THE DRAWINGS

Other characteristics and advantages of the invention appear on reading the following description of particular non-limiting embodiments given with reference to the accompanying drawings, in which.

MORE DETAILED DESCRIPTION

FIGS. 1 to 4 show intersection apparatus of the invention for two pallet conveyors. Two main conveyor portions 1 and 3 of a main conveyor 5 can be seen extending in a main direction, and two secondary conveyor portions 7 and 9 of a secondary conveyor 11 can be seen extending in a secondary direction which is substantially perpendicular to the main direction. The portions 1, 3, 7, and 9 are connected to a central portion 13 which is thus situated at the intersection of the conveyors 5 and 11. Three pallets 15, 17, and 19 are, in the configuration shown in FIG. 1, disposed respectively on the conveyor portion 1, on the central portion 13, and on the conveyor portion 7.

Each of the portions 1, 3, 7, and 9 is provided with a pallet way, referenced 25 for the conveyor 5 and 27 for the conveyor 11, for supporting the pallets, and drive means for driving the pallets along the pallet way. In the example shown, each pallet way 25, 27 comprises a support bed 29 bordered by two longitudinal guiding curbs 31. The drive means for driving the pallets are implemented in the form of a conveyor belt 33 covering the bed 29.

According to an essential characteristic of the invention, the pallet way 25 of the conveyor 5 extends at a level that is different from the level of the pallet way 27 of the conveyor 11. More precisely, the level of the pallet way 25 is significantly lower than the level of the pallet way 27. In addition, the central portion 13 is mounted to move between a low position in which it extends at the same level as the pallet way 25 and a high position in which it extends at the same level as the pallet way 27. The central portion thus forms lift means for vertically displacing a pallet situated on the central portion (pallet 17 in the configuration shown in FIG. 1) between two levels corresponding to the levels of the pallet ways 25 and 27.

According to another essential characteristic of the invention, each of the pallets 15, 17, 19 is provided with peripheral coupling means 21 organized so that, when the pallet is situated on the central portion 13, they face respective ones of the conveyor portions 1, 3, 7, and 9. By vertically displacing the pallet on the central portion 13, its peripheral coupling means can be engaged with complementary coupling means on a pallet situated on one of the conveyor portions, or they can be disengaged from such complementary means. More precisely, the coupling means are organized so that the coupling means of a pallet situated on the central portion 13 (pallet 17 in the configuration shown in FIG. 1) are engaged with the coupling means of a pallet situated on a pallet way whose level is the same as that of the central portion 13, and they are disengaged from the coupling means of a pallet situated on a pallet way whose level is different. In the example, the coupling means 21 are constituted by U-shaped hooks whose branches extend horizontally.

Figure 1:
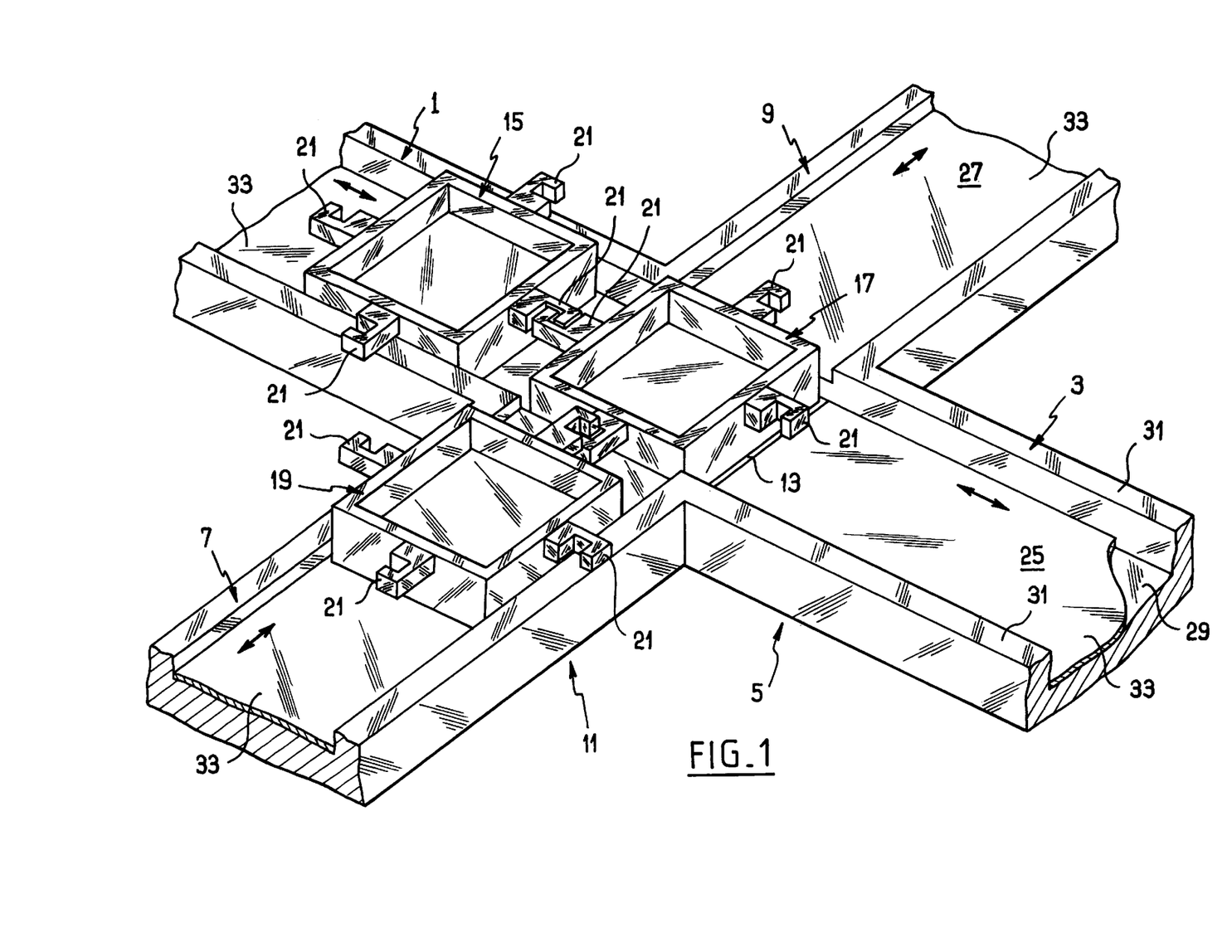
FIGS. 1 to 4 are diagrammatic perspective views of pallet conveyor intersection apparatus of the invention, showing, by way of example, the successive steps of a pallet switching operation.

Thus, in the configuration shown in FIG. 1, the central portion 13 is in the low position, i.e. it is at the same level as the pallet way 25: the portions 1 and 3 of the conveyor 5. The hook 21 facing the portion 1 is thus engaged with the corresponding hook 21 on the pallet 15, while the hook 21 of the pallet 17 that is facing the portion 7 is disengaged from the corresponding hook on the pallet 19. Conversely, in the configuration shown in FIG. 2, the central portion 13 is in the high position, i.e. it extends at a level identical to that of the pallet way 27 of the conveyor 11. In which case, the hook 21 of the pallet 17 that is facing the portion 7 is engaged with the corresponding hook 21 on the pallet 19, while the hook 21 on the pallet 17 that is facing the portion 1 is disengaged from the corresponding hook 21 on the pallet 15.

To make it easier to understand how the apparatus of the invention operates, FIGS. 1 to 4 show, by way of example, the various steps making it possible to transfer the pallet 17 onto the portion 9 of the secondary conveyor 11, and to transfer the pallet 19 onto the main conveyor 5. The initial step is shown in FIG. 1. The pallets 15 and 17 are both disposed on the main conveyor 5, and they are coupled together by their hooks 21, the central portion 13 being in the low position. The pallet 19 is disposed on the portion 7 of the secondary conveyor 11 in the ready position.

Figure 2:
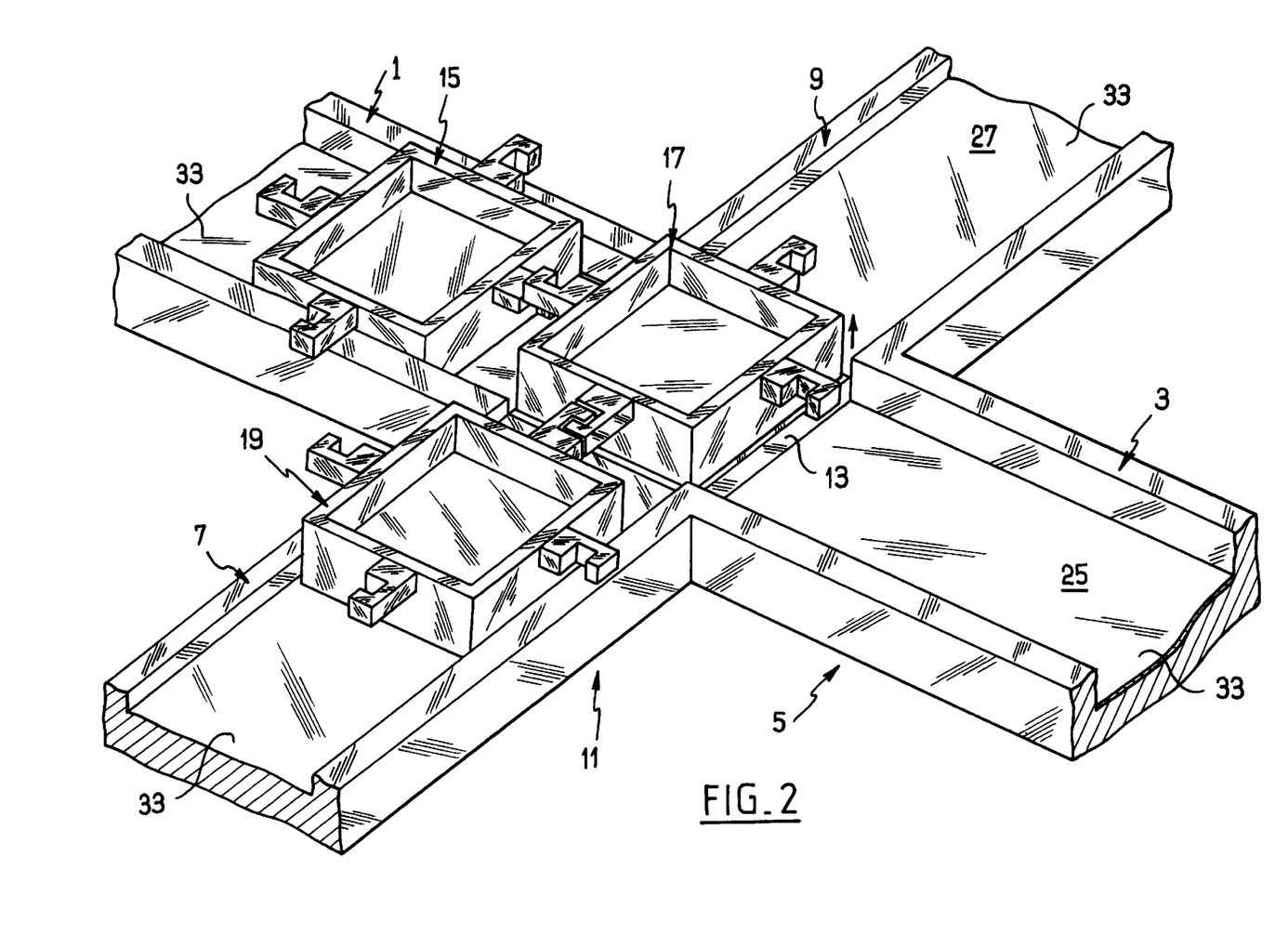

As shown in FIG. 2, the central portion 13 is actuated so that it comes into its high position, thereby placing the pallet 17 at the level of the pallet way 27 of the secondary conveyor 11. On elevating the pallet 17, the hook 21 of the pallet 17 that is situated facing the pallet 15 disengages from the corresponding hook 21 on said pallet 15. Conversely, the hook 21 of the pallet 17 that is situated facing the pallet 19 engages with the corresponding hook 21 on said pallet 19. Thus, in the configuration shown in FIG. 2, the pallet 17 is fully released from the pallet 15, and it is coupled to the pallet 19.

Figure 3:
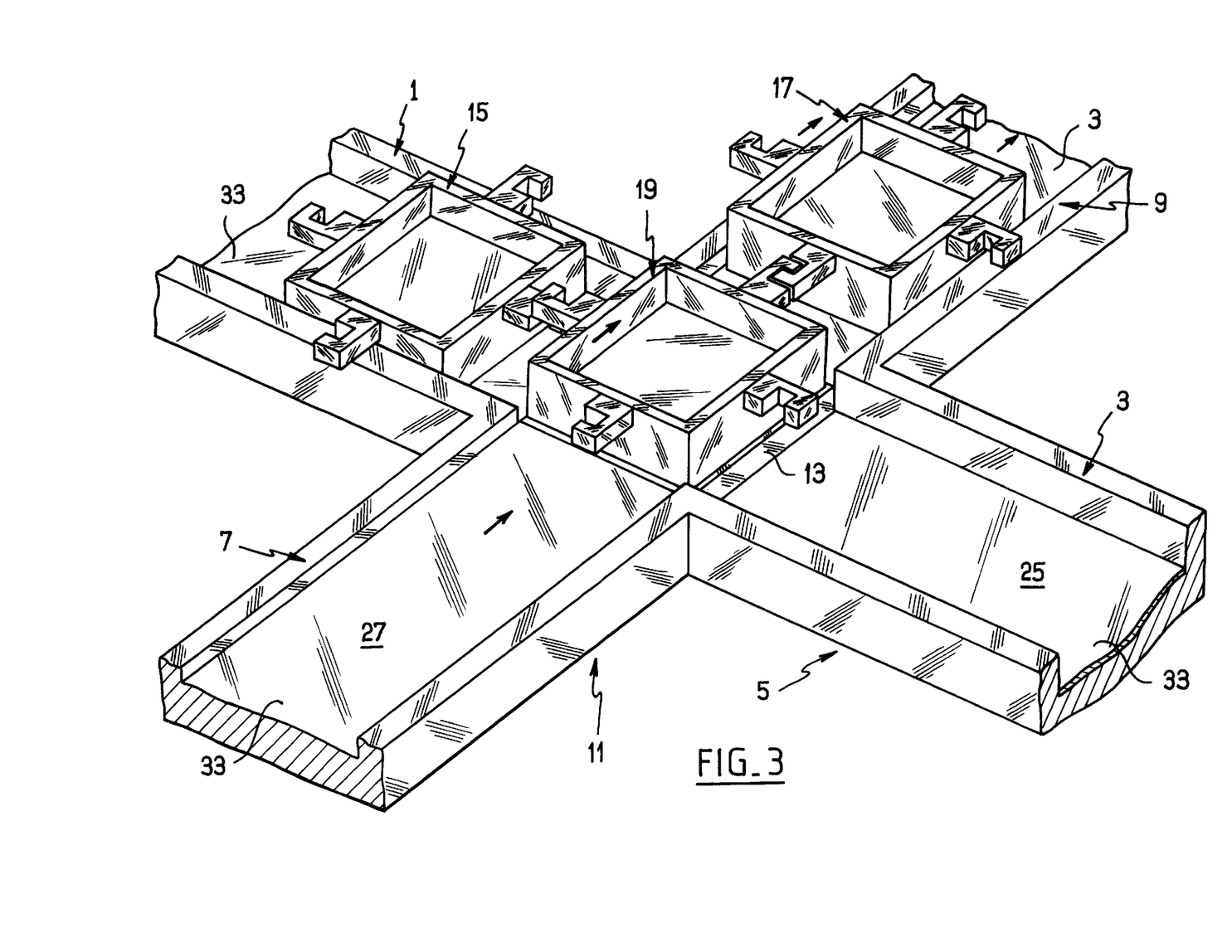

As shown in FIG. 3, the conveyor belt 33 of the portion 7 drives the pallet 19 towards the central portion 13. The pallet 17 is pushed by the pallet 19 onto the portion 9 and is in turn driven by the conveyor belt 33 of the portion 9 so that it is placed entirely on said portion 9. Once the pallet 19 rests entirely on the central portion 13, the conveyor belts 33 of the portions 7 and 9 are stopped.

Figure 4:
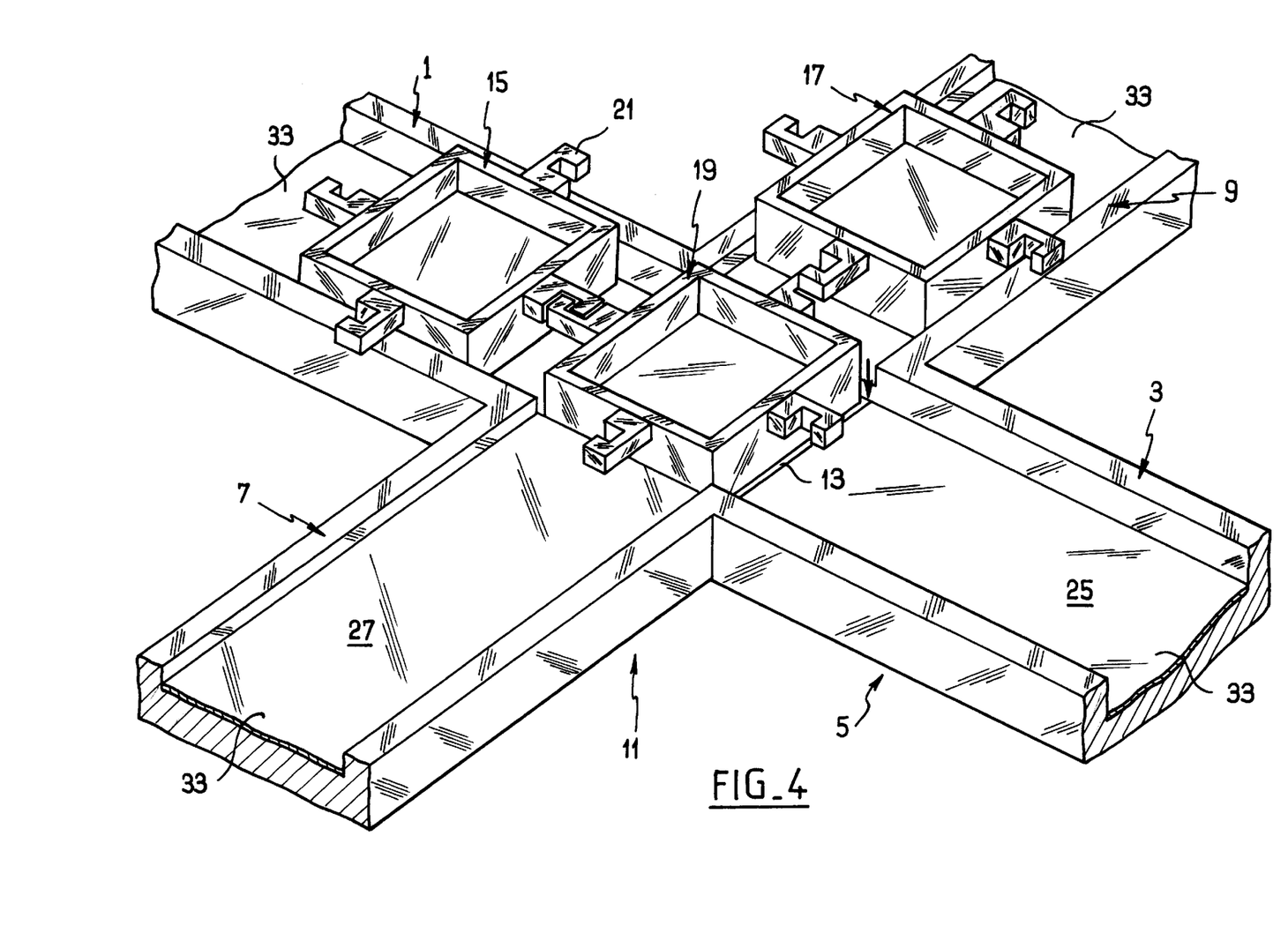

Finally, as shown in FIG. 4, the central portion 13 is actuated to return to its low position so that the hook 21 of the pallet 19 that is facing the pallet 17 is disengaged from the corresponding hook 21 of the pallet 17, and the hook 21 of the pallet 19 that is facing the pallet 15 is engaged with the corresponding hook 21 of said pallet 15. The pallet 19 is then coupled to the pallet 15 and can therefore travel with it along the pallet way 25 of the main conveyor 5.

Naturally, the example of displacement given above is not limiting, and any other type of intersecting displacement may be implemented.

Figure 5:
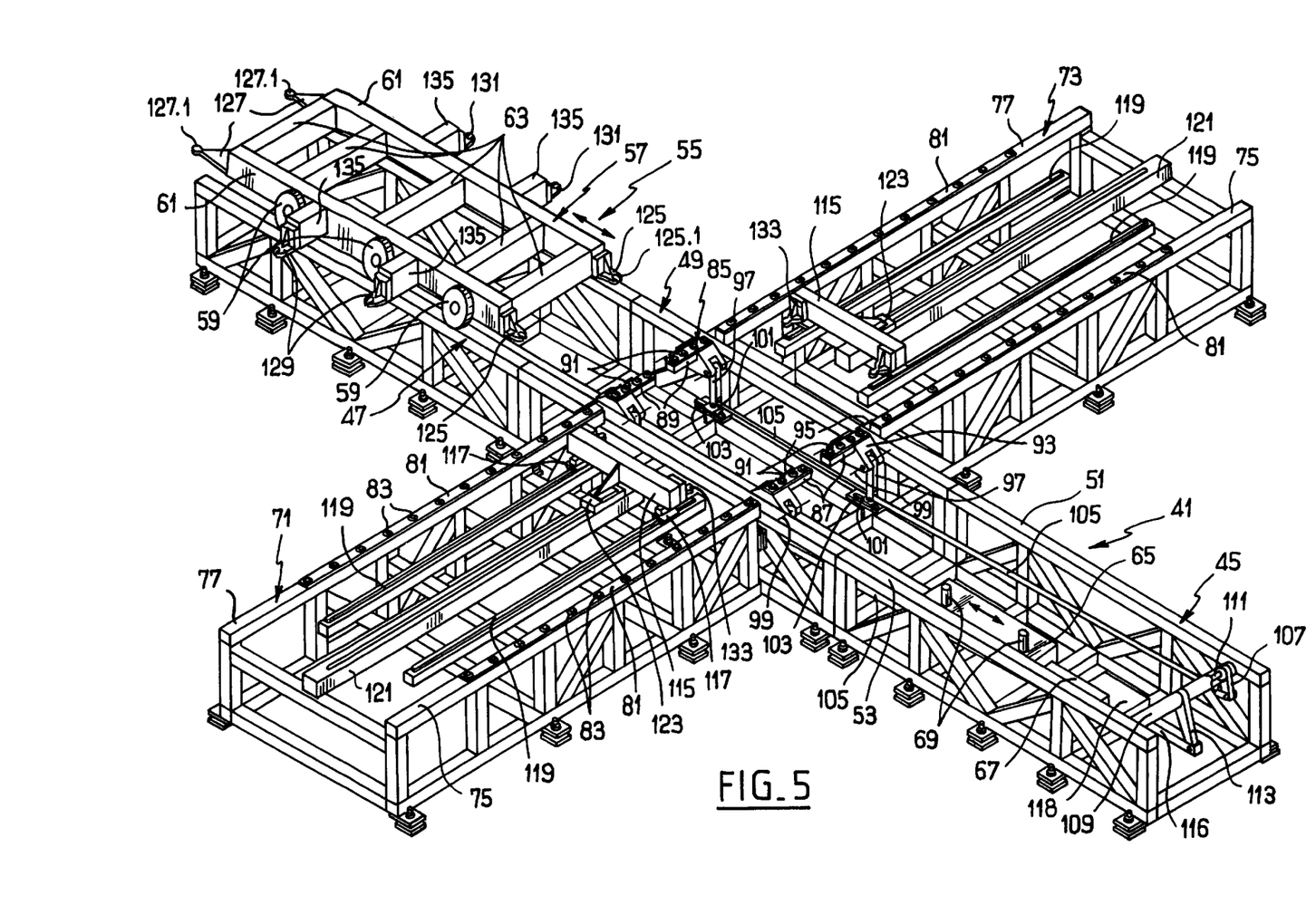
FIG. 5 is a perspective view showing an improved embodiment of pallet conveyor intersection apparatus of the invention, suited to implementing pallet change-over apparatus of the invention for a pallet conveyor.

FIG. 5 shows an improved embodiment of the intersection apparatus suitable for implementing pallet change-over apparatus for a pallet conveyor of the type used in an assembly workshop, in particular an assembly shop for assembling together sheet metal parts. This apparatus includes a main conveyor 41 designed to serve various workstations (not shown), and comprising three conveyor portions, namely two end portions 45 and 47, and a central portion 49. The three portions are provided with a common pallet way which is implemented in the form of two rails 51 and 53 carried by a conventional metal trellis structure which is not described in any more detail. The rails 51 and 53 of the three portions 45, 47, 49 are connected together to form two continuous rails which are given the same references 51 and 53 so as not clutter the figure.

A pallet 55 is carried by the rails 51 and 53 of the conveyor 41. The pallet 55 comprises a frame 57 mounted on wheels 59 which stand on the rails 51 and 53. In this example, the frame 57 is implemented in the form of an assembly of beams comprising two parallel longitudinal members 61, and a series of cross-members 63. There are six wheels, with three wheels being fixed to each of the longitudinal members 61.

The conveyor 41 is equipped with drive means for driving the pallet 55 along the rails 51 and 53. In this example, the drive means are implemented in the form of a carriage 65 which is mounted to slide on a longitudinal runner 67. In this example, the carriage 65 is shown in a position where it is distant from the pallet 55 to make the figure more legible. But, in operation, the carriage is situated under the pallet 55 to drive it along the conveyor 41. In this example, the carriage 65 is provided with retractable engagement means for coupling it to the pallet 55. The engagement means in this example are implemented in the form of two fingers 69 mounted to move between a projecting position in which, when the carriage 65 is situated beneath the pallet 55, they penetrate into associated recesses (not shown) provided in two of the cross-members 63, so as to couple the carriage 65 to the pallet 55, and a retracted position, in which the carriage 65 can slide on the runner 67 independently of the pallet 55.

The apparatus further includes two secondary conveyor portions 71 and 73 which are connected facing each other to the central portion 49 of the conveyor 41. In this example, these two conveyor portions are identical, and each of them is provided with a pallet way implemented in the form of two rails 75 and 77 substantially perpendicular to the rails 51 and 53 of the main conveyor 41, and mounted on a conventional load-bearing metal trellis structure which is not described in any further detail. The rails 75 and 77 are further equipped with roller strips 81 provided with a plurality of rollers 83 serving to enable a pallet such as 55 to be slid along the rails 75 and 77.

According to an essential characteristic of the invention, the rails 75 and 77 extend in a plane situated at a level that is different from the level of the rails 51 and 53 of the conveyor 41. In this example, the level of the rails 75 and 77 is significantly higher than the level of the rails 51 and 53.

The apparatus further includes a secondary conveyor central portion 85 disposed between the secondary conveyor portions 71 and 73, and including a pallet way that is mounted to move vertically between a high position in which it extends at the same level as the rails 75 and 77 of the secondary conveyor portions 71 and 73, and a low position in which it extends at a level that is lower than the level of the rails 51 and 53 of the main conveyor, to enable the pallet 55 to travel over the central portion 49 of the conveyor 41. In this example, the pallet way of the portion 85 is constituted by four rail segments comprising two segments 87 that, in the high position, are disposed in alignment with the rails 75 of the portions 71 and 73, and two segments 89 that, in the high position, are situated in alignment with the rails 77 of the portions 71 and 73. Each rail segment 87, 89 is equipped with a roller strip 91 similar to the roller strips 81 equipping the rails of the portions 71 and 73. The portion 85 and the portion 49 of the main conveyor 41 form a central intersection portion.

In the example shown, the central portion 85 is vertically displaced by means of a lift mechanism. For each rail segment 87, 89, this mechanism comprises a pivotally mounted support 93 which is mounted on the load-bearing structure of the conveyor 41 to pivot about an axis 95 that is substantially perpendicular to the general direction of said conveyor. The pivotally mounted support 95 is further hinged to a link 97 about an axis 99 that is parallel to and distant from the axis 95. The link 97 extends downwards, and its bottom end is provided with a slide 101 which is mounted to slide along a slideway 103 secured to the load-bearing structure of the conveyor 41 substantially parallel to the direction of said conveyor. In addition, the ends of the links 97 are connected together in pairs by a rod 105. The rod is hinged via its ends to the ends of the links 97 that are associated with the rail segments 87 and 89 adjacent to the same secondary portion 71, 73. Each pair of slides 101 interconnected by the same rod 105 is displaced by a drive rod 105 which is hinged, via one of its ends, to the bottom end of the link 97 associated with the rail segment 87, and via its other end to a lever 107 which is mounted to pivot on a hollow bar 109 secured to the load-bearing structure of the portion 45 of the conveyor 41. The lever 107 is constrained to rotate with a pin 111 mounted to rotate inside the hollow bar 109, and caused to rotate by a lever 113, itself hinged, via its other end, to a drive rod 116 of a control member 118 such as, for example, a hydraulic or pneumatic actuator.

Each of the portions 71 and 73 is provided with drive means for driving the pallet 55. In this example, the drive means are constituted by a slidably mounted carriage 115 mounted on the corresponding portion to slide in the direction of the portion. In this example, the carriage 115 is provided with two slides 117 mounted on associated runners 119 which guide the carriage 115 as it slides. The carriage 115 is driven by a driving member which, in this example, is implemented in the form of a drive rail 121 on which a shoe 123 coupled to a drive mechanism such as a chain (not visible in the figures) driven by a motor (not visible in the figures) and disposed inside the rail 121, or a pneumatic actuator.

The pallet 55 is further provided with peripheral coupling means 125, 127, 129, and 131 disposed facing respective ones of the portions 45, 47, 71 and 73 when the pallet 55 is situated on the central portion. The coupling means 125 and 127 are complementary to one another and can be engaged with the corresponding coupling means 127 and 125 of an adjacent pallet carried by the rails 51, 53 of the conveyor 41, or disengaged from such corresponding coupling means, by vertically displacing the pallet carried by the rails 87 and 89. In this example, these means are implemented in the form of hooks fixed to respective longitudinal members 61 and organized to hook onto corresponding means by having complementary shapes. Each of the two hooks 127 thus has a cylindrically shaped end 127.1, whereas each of the two hooks 125 has a complementary ring-shaped end 125.1 that is open to the end 127.1 of the corresponding hook 127.

The coupling means 129 and 131 associated with the portions 71 and 73 can be engaged with complementary coupling means 133 equipping the carriages 115, or disengaged from such complementary coupling means, by vertically displacing the pallet carried by the rails 87 and 89. In this example, each the coupling means 129 and 131 is implemented in the form of two hooks identical to the hooks 125, and the hooks are mounted on respective projecting stub beams 135 secured to the longitudinal members 61 of the pallet 55, while the coupling means 133 on each carriage are implemented in the form of two hooks identical to the hooks 127 of the pallet 55. Furthermore, the hooks 129 and 131 of the pallet 55, and the hooks 133 of the carriages 115 are organized such that, when the pallet 55 is situated on the central portion 49 of the conveyor 41 and when the central portion 85 is in the low position, the hooks 129 and 131 are disengaged from the hooks 133, and, when the central portion 85 is in the high position and when it raises the pallet 55 to the height of the portions 71 and 73, either the hooks 129 or the hooks 131 are engaged with the hooks 133 of a corresponding one of the carriages 115, as explained in more detail below.

FIG. 5 shows only the pallet that is on the conveyor 41 so as not to clutter the figure, this configuration naturally being theoretical. In operation, the pallet change-over apparatus is provided with three pallets identical to the pallet 55, one pallet being disposed on the conveyor 41, while the other two pallets are disposed on the portions 71 and 73. The pallets that are situated on the portions 71 and 73 are coupled to the respective carriages 115 associated with these portions by their hooks 129, 131 which are engaged with the hooks 133 on the carriages. Each of the carriages 115 is in the set-back position remote from the conveyor 41.

Let us now assume that the pallet that is on the conveyor 41 is to be changed over with the pallet that is on the portion 71. For this purpose, the carriage 115 pushes the pallet to which it is coupled onto the rails 87 and 89 of the central portion 85, once the rails have been placed in the high position. It should be noted that the fact that two hooks 133 are provided co-operating with the two hooks 129 associated with the pallet ensures that the pallet is held in the longitudinal direction of the portions 71 and 73, without it being necessary to provide other means for guiding the pallet over these portions. The rails 87 and 89 of the central portion 95 are then displaced by the lift mechanism so that they come into their low position, thereby placing the pallet that they are supporting on the rails 51 and 53 of the central portion 49 of the conveyor 41. During the descent, the hooks 127 of the pallet situated on the central portion 85 are engaged with the hooks 125 of the pallet 55 which is positioned accurately by the carriage 65 so as to make such engagement possible in a vertical direction. The two pallets which are situated on the conveyor 41 are thus coupled together.

The fingers 69 of the carriage 65 are retracted so that said carriage is no longer connected to the pallet 55. The carriage 65 slides independently of the pallet 55 until it is placed beneath the pallet situated on the central portion 49. The fingers 69 are deployed and are engaged inside the associated recesses (not shown) in the cross-members 63 of the pallet so as to couple the carriage 65 positively to the pallet. The carriage 65 slides towards the portion 45 to bring the pallet that was initially situated on the central portion 49 onto the portion 45, and to bring the pallet 55, which was initially situated on the portion 47, onto the central portion 49.

The rails 87 and 89 of the central portion 85 are placed in their high position by the lift mechanism, thereby raising the pallet 55 to place it at the height of the portions 71 and 73. During the raising, the hooks 125 of the pallet are disengaged from the hooks 127 of the pallet situated on the portion 45 of the pallet way of the conveyor 41, while the hooks 129 of the pallet 55 are engaged with the hooks 133 of the carriage 115 associated with the portion 71. The pallet 55 is then coupled to the carriage 115, and the carriage slides away from the conveyor 41, thereby causing the pallet 55 to slide onto the portion 71. Once the pallet 55 has stopped sliding, and it is fully disengaged from the central portion 85, the rails 87 and 89 of said central portion are lowered into their low position. The pallet situated on the conveyor is thus free to slide along said conveyor.

In the same way, the pallet situated on the conveyor 41 may be replaced with the pallet situated on the portion 73.

The invention is not limited to the particular embodiments described above, but rather it extends to any apparatus that uses equivalent means to reproduce the above-mentioned essential characteristics.

Although the description concerns pallet change-over apparatus for a pallet conveyor, it is naturally possible to implement analogous apparatus for a conveyor using other types of support for supporting parts in subassemblies or assemblies. For example, if the supports are more lightweight such as cassettes that remain associated with the assembled-together parts throughout construction of the assembly to be assembled, it is possible to implement cassette-loading apparatus analogous to the above-described pallet change-over apparatus, the secondary conveyor portions being used to feed the conveyor with various types of cassette. The secondary conveyor portions are then equipped, at their ends remote from the conveyor, with cassette feed systems, each secondary conveyor portion receiving a determined type of cassette. The conveyor can then be fed via one or other of the secondary conveyor portions as a function of the desired type of cassette. The cassette deposited on the conveyor in this way may be retrieved subsequently by cassette change-over or retrieval apparatus disposed downstream from the feed apparatus and of analogous structure.

I claim:

1. Pallet conveyor intersection apparatus comprising a central portion (13; 49, 85) and conveyor portions (1, 3, 7, 9; 45, 47, 71, 73) connected to the central portion (13; 49, 85), each of the conveyor portions being provided with a pallet way (25; 51, 53, 75, 77) for supporting pallets (15, 17, 19; 55), and with drive means (33; 65, 115) for driving the pallets along the pallet way, said apparatus being characterized in that the pallet ways (25; 51, 53, 75, 77) of at least two of the conveyor portions (1, 3, 7, 9; 45, 47, 71, 73) are disposed at different levels, in that the central portion (13; 49, 85) is provided with lift means (13; 85) for vertically displacing a pallet (15, 17, 19; 55) situated on the central portion between levels corresponding to the different levels of the pallet ways (25; 51, 53, 75, 77) of the conveyor portions (1, 3, 7, 9; 45, 47, 71, 73), and in that the pallet is provided with peripheral coupling means (21; 125, 127, 129, 131) organized facing at least one of the conveyor portions (1, 3, 7, 9; 45, 47, 71, 73), which means can be engaged with or disengaged from complementary coupling means (21; 125, 127, 133) associated with the facing conveyor portion, by vertically displacing the pallet by means of the above-mentioned lift means.

2. Intersection apparatus according to claim 1, characterized in that the complementary coupling means (21; 125, 127) associated with the conveyor portion (1, 3, 7, 9; 45, 47) facing the peripheral coupling means (21; 125, 127) of the pallet (17; 55) are carried by a pallet (15, 19; 55) situated on said conveyor portion (1, 3, 7, 9; 45, 47).

3. Intersection apparatus according to claim 1, characterized in that the complementary coupling means (133) associated with the conveyor portion (71, 73) facing the peripheral coupling means (129, 131) of the pallet (55) are carried by a carriage (115) mounted to slide parallel to the pallet way (75, 77) of said conveyor portion.

4. Intersection apparatus according to claim 1, characterized in that the coupling means (21; 125, 127, 129, 131, 133) are hooks of the type having complementary shapes.

5. Intersection apparatus according to claim 1, characterized in that it comprises two main conveyor portions (1, 3; 45, 47) whose pallet ways (25; 51, 53) extend at the same level in a main direction on either side of the central portion (13; 49, 85), and at least one secondary conveyor portion (7, 9; 71, 73) whose pallet way (27; 75, 77) extends at a different level in a secondary direction that is substantially perpendicular to the main direction.

6. Intersection apparatus according to claim 5, characterized in that the pallet ways (25; 51, 53) of the main conveyor portions (1, 3; 45, 47) are situated at a level that is lower than the level of the pallet way (27; 75, 77) of the secondary conveyor portion (13; 49, 85).

7. Intersection apparatus according to claim 4, characterized in that it includes two secondary conveyor portions (7, 9; 71, 73) whose pallet ways (27; 75, 77) extend at the same level in the secondary direction on either side of the central portion (13; 49, 85).

8. Intersection apparatus according to claim 6, characterized in that the central portion (49, 85) comprises a main conveyor central portion (49) having a fixed pallet way (51, 53) interconnecting the pallet ways (51, 53) of the two main conveyor portions (45, 47), so that the three portions form an uninterrupted main conveyor portion (41), and a secondary conveyor central portion (85) having a pallet way (87, 89) that is mounted to move vertically between a high position in which it extends in alignment with the pallet way (75, 77) of the secondary conveyor portion (71, 73), and a low position in which it allows a pallet (55) to travel over the pallet way (51, 53) of the main conveyor central portion (49).

9. Intersection apparatus according to claim 8, characterized in that the main conveyor portions (45, 47, 49) form a main conveyor (41), which conveyor is provided with drive means which comprise a carriage (65) mounted to slide on a runner (67) parallel to the pallet way (51, 53) of the main conveyor (41), and equipped with retractable engagement means (69) for coupling the carriage to a pallet (55) carried by the pallet way (51, 53) of the main conveyor (41).

10. Pallet change-over apparatus for a pallet conveyor, said apparatus being characterized in that it comprises intersection apparatus according to claim 5, in which the secondary conveyor portions (71, 73) form sidings for parking the pallets.

* * * * *